US010066653B2

United States Patent
Guidi et al.

(10) Patent No.: US 10,066,653 B2
(45) Date of Patent: Sep. 4, 2018

(54) SUB-RETAINING STRUCTURE AND RETAINING STRUCTURE

(71) Applicants: DENSO International America, Inc., Southfield, MI (US); DENSO CORPORATION, Kariya, Aichi-pref. (JP)

(72) Inventors: Paolo V. Guidi, Macomb, MI (US); Kyle M. Renno, New Baltimore, MI (US); Ashley N. Justman, Utica, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 87 days.

(21) Appl. No.: 15/382,783

(22) Filed: Dec. 19, 2016

(65) Prior Publication Data

US 2018/0172044 A1    Jun. 21, 2018

(51) Int. Cl.
   *F16B 43/02*    (2006.01)
   *F16B 5/02*     (2006.01)

(52) U.S. Cl.
   CPC .......... *F16B 5/0241* (2013.01); *F16B 5/0258* (2013.01); *F16B 43/02* (2013.01)

(58) Field of Classification Search
   CPC .... F16B 5/0241; F16B 5/0258; F16B 43/001; F16B 43/02
   USPC ........ 411/103, 172, 383, 517, 546, 545, 547
   See application file for complete search history.

(56) References Cited

U.S. PATENT DOCUMENTS

| | | | | | |
|---|---|---|---|---|---|
| 2,354,748 | A | * | 8/1944 | Franklin | F16B 9/023 411/517 |
| 2,957,196 | A | * | 10/1960 | Delgadillo | F16B 5/01 16/2.1 |
| 3,085,613 | A | * | 4/1963 | Carpenter | F16B 37/00 411/103 |
| 5,236,272 | A | * | 8/1993 | Hibbard | F16B 43/001 403/24 |
| 6,499,923 | B2 | * | 12/2002 | LeVey | F16B 37/042 411/172 |
| 7,708,512 | B2 | | 5/2010 | McLean et al. | |
| 8,702,362 | B2 | * | 4/2014 | Zhu | F16B 7/18 411/166 |
| 2006/0233627 | A1 | * | 10/2006 | Weinstein | F16B 39/04 411/369 |
| 2013/0071203 | A1 | | 3/2013 | Hay | |

* cited by examiner

*Primary Examiner* — Roberta S Delisle

(57) ABSTRACT

A sub-retaining structure includes a retainer and a compression limiter. The retainer having an attachment hole is provided in a sub-component. A compression limiter is disposed in the attachment hole of the retainer. The compression limiter has a cylindrical shape with a through hole coaxial with the attachment hole. The compression limiter defines multiple side openings arranged in a circumferential direction. The retainer includes multiple retainer arms each of which extends radially inward of the compression limiter through the side openings, respectively. The retainer arms are configured to be engageable with a fastener protruding from a main-component when the fastener is inserted into the through hole.

18 Claims, 12 Drawing Sheets

FIG. 3
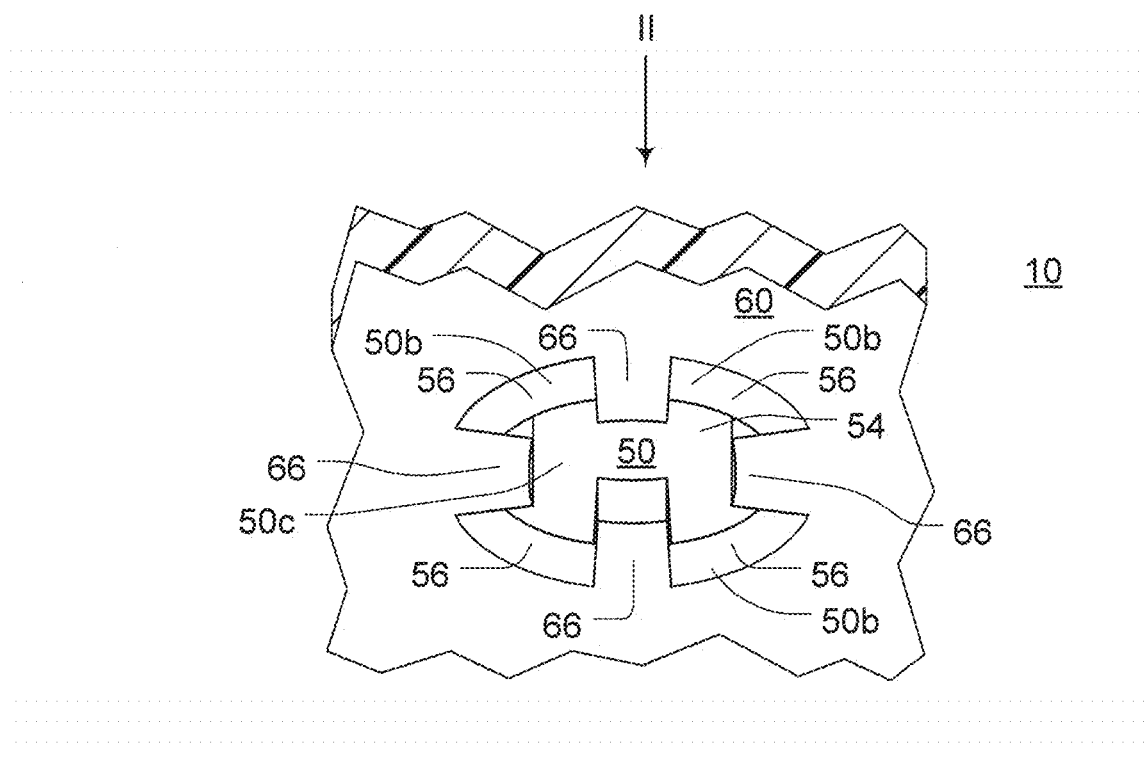
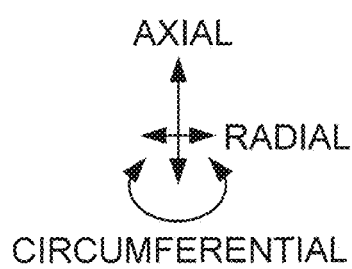

FIG. 4
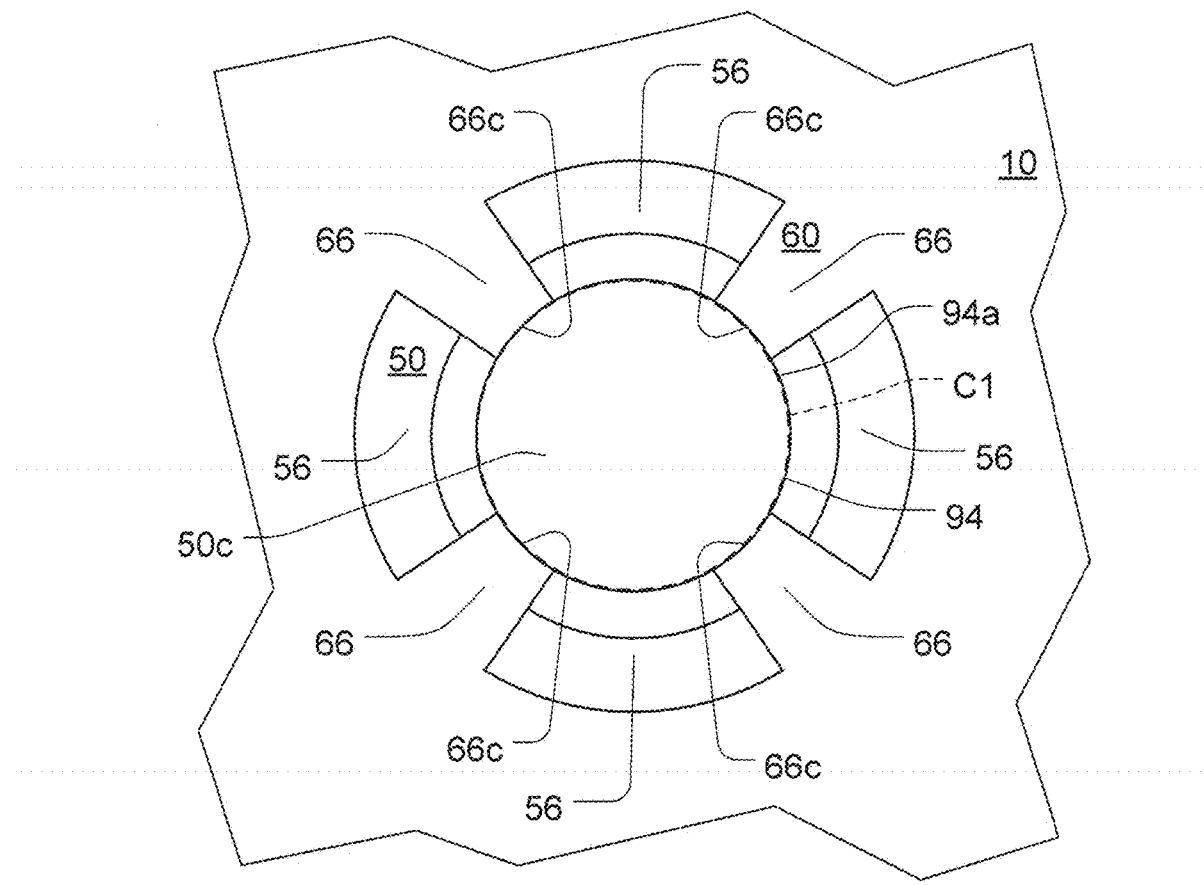
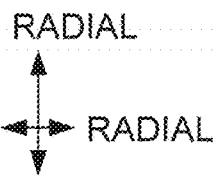

US 10,066,653 B2

SUB-RETAINING STRUCTURE AND RETAINING STRUCTURE

TECHNICAL FIELD

The present disclosure relates to a sub-retaining structure for temporarily attaching a sub-component to a main-component and a retaining structure for fixing the sub-component to the main-component.

BACKGROUND

Conventionally, a vehicle is equipped with various components. For example, multiple components may be assembled into an assembly module, and the assembly module may be mounted to a vehicle.

In a manufacturing process of a vehicle, a technician may mount the assembly module to a vehicle in a factory. In such a situation, a technician may need to screw fasteners while holding the assembly module onto a body of the vehicle. In addition, the assembly module may be desirably protected from excessive compression force of the fastener.

SUMMARY

According to an aspect of the present disclosure, a sub-retaining structure is for temporarily attaching a sub-component to a main-component. The sub-retaining structure comprises a retainer provided in the sub-component and having an attachment hole. The sub-retaining structure further comprises a compression limiter disposed in the attachment hole of the retainer. The compression limiter has a cylindrical shape with a through hole coaxial with the attachment hole and defines a plurality of side openings arranged in a circumferential direction. The retainer includes a plurality of retainer arms each of which extends radially inward of the compression limiter through the plurality of side openings. The plurality of retainer arms are configured to be engageable with a fastener protruding from the main-component when the fastener is inserted into the through hole.

According to another aspect of the present disclosure, a retaining structure is for fixing a sub-component to a main-component. The retaining structure comprises a retainer disposed in the sub-component and having an attachment hole. The retaining structure further comprises a compression limiter disposed in the attachment hole of the retainer. The retaining structure further comprises a fastener fixed to the main-component and protruding from the main-component. The compression limiter has a cylindrical shape with a through hole coaxial with the attachment hole and defines a plurality of side openings arranged in a circumferential direction. The retainer includes a plurality of retainer arms each of which extends radially inward of the compression limiter through the plurality of side openings. The plurality of retainer arms are configured to be engageable with the fastener when the fastener is inserted into the through hole.

The above and other objects, features and advantages of the present invention will become more apparent from the following detailed description made with reference to the accompanying drawings. In the drawings:

FIG. 3 is a perspective bottom view showing the subassembly module when viewed along an arrow III in FIG. 2;

FIG. 4 is a schematic bottom view showing one example of alignment between the subassembly module and a fastener;

DETAILED DESCRIPTION

First Embodiment

As follows, a first embodiment of the present disclosure will be described with reference to drawings. In the description, a radial direction is along an arrow represented by "RADIAL" in drawing(s). An axial direction is along an arrow represented by "AXIAL" in drawing(s). A circumferential direction is along an arrow represented by "CIRCUMFERENTIAL" in drawing(s).

Figure 7:
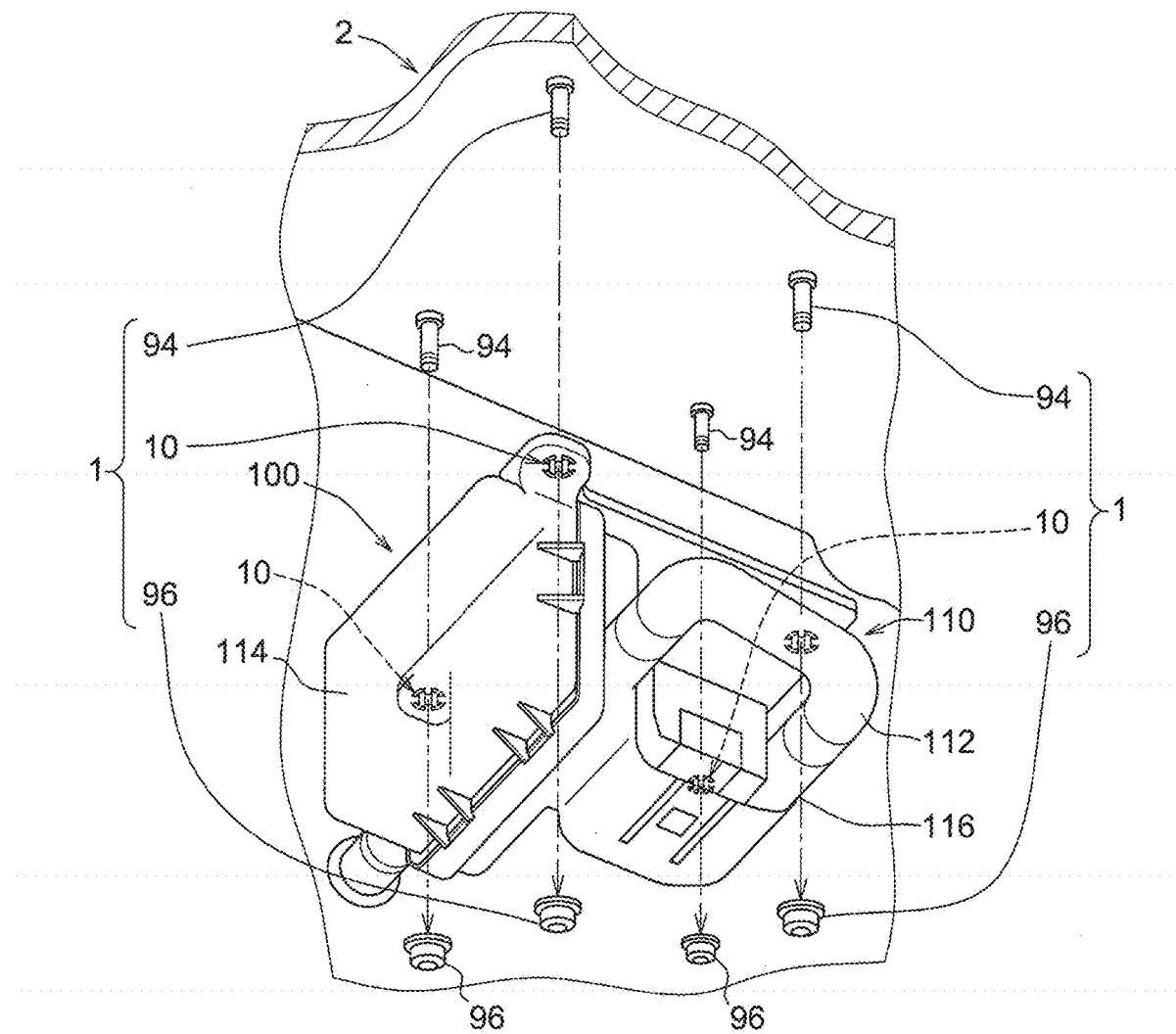
FIG. 7 is a perspective bottom view showing a subassembly module to be equipped to an underbody of a vehicle.

In the present embodiment, a subassembly module 100, as a sub-component, is installed to an underbody 2, as a main-component, of a vehicle through a retaining structure 1 (see FIG. 7). The subassembly module 100 is formed into a singular object by assembling, for example, a bracket 110, a pipe manifold 112, a valve device 114, an intercooler 116, and so on. The subassembly module 100 is temporarily retained under the underbody 2 through a sub-retaining structure 10, and then the subassembly module 100 is fixedly mounted to the underbody 2 through the retaining structure 1. In the present embodiment, a plurality of retaining structures 1 (and a plurality of sub-retaining structures 10) are used to fix the sub-assembly 100 to the underbody 2. Hereinafter, one of the retaining structures 1 (and the sub-retaining structure 10) will be described as a representative example.

Each sub-retaining structure 10 is formed in the subassembly module 100, more specifically, in the bracket 110 of the subassembly module 100. The retaining structure 1 can be defined as a structure that includes the sub-retaining structure 10 and further includes a fastener 90 (a combination of a stud bolt 94 and a nut 96) to fix the subassembly module 100 with respect to the underbody 2.

Figure 1:
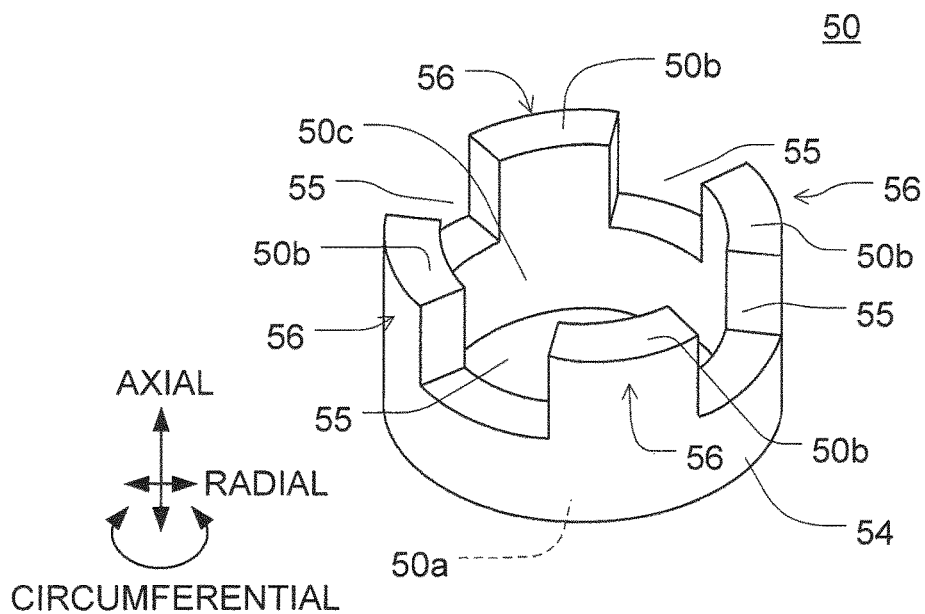
FIG. 1 is a perspective top view showing a compression limiter of a subassembly module.

Next, the sub-retaining structure 10 will be described below. The sub-retaining structure 10 generally includes a compression limiter 50 and a retainer 60. With reference to FIG. 1, the compression limiter 50 has a limiter body 54 and multiple limiter legs 56. In the present embodiment, the compression limiter 50 is generally in a cylindrical shape having a through hole 50c. The compression limiter 50 has notches (side openings) 55, and each of the notches 55 is interposed between two limiter legs 56, which are adjacent to each other in the circumferential direction. In other words, the notches 55 are arranged in the circumferential direction of the compression limiter 50. Each of the notches 55 forms a cavity through which a respective one of retainer arms 66 of a retainer 60 (described later) is molded to extend therethrough into an inner space of the compression limiter 50. Each of the notches 55 and the limiter legs 56 is in a rectangular shape when viewed along the radial direction. More specifically, each of the notches 55 is a slit recessed from a second end surface 50b of the compression limiter 50 toward a first end surface 50a of the compression limiter 50. The first end surface 50a and the second end surface 50b are opposite to each other in the axial direction.

In the present embodiment, one end of the limiter body 54 serves as the first end surface 50a. The limiter legs 56 extend in the axial direction from one end of the limiter body 54. The limiter legs 56 are distant from each other in the circumferential direction. Each of the limiter legs 56 has an end surface that serves as the second end surface 50b of the compression limiter 50. When viewed along the axial direction, the limiter body 54 has a cross section in an annular shape, and the limiter leg 56 has a cross section in an arc shape. The cross section of the limiter leg 56, which is in the arc shape, is identical to a cross section of a portion of the limiter body 54, from which the limiter leg 56 extends.

The compression limiter 50 is formed of metal such as aluminum alloy and/or stainless steel. Alternatively, the compression limiter 50 may be formed of a resin material such as ABS resin, acrylic resin, polycarbonate resin, and/or polyphenylene sulfide (PPS). The compression limiter 50 may be formed of a material higher in mechanical strength and/or melting point than the material of the retainer 60. The compression limiter 50 may be injection molded, casted, and/or shaped by a machining work.

Figure 2:
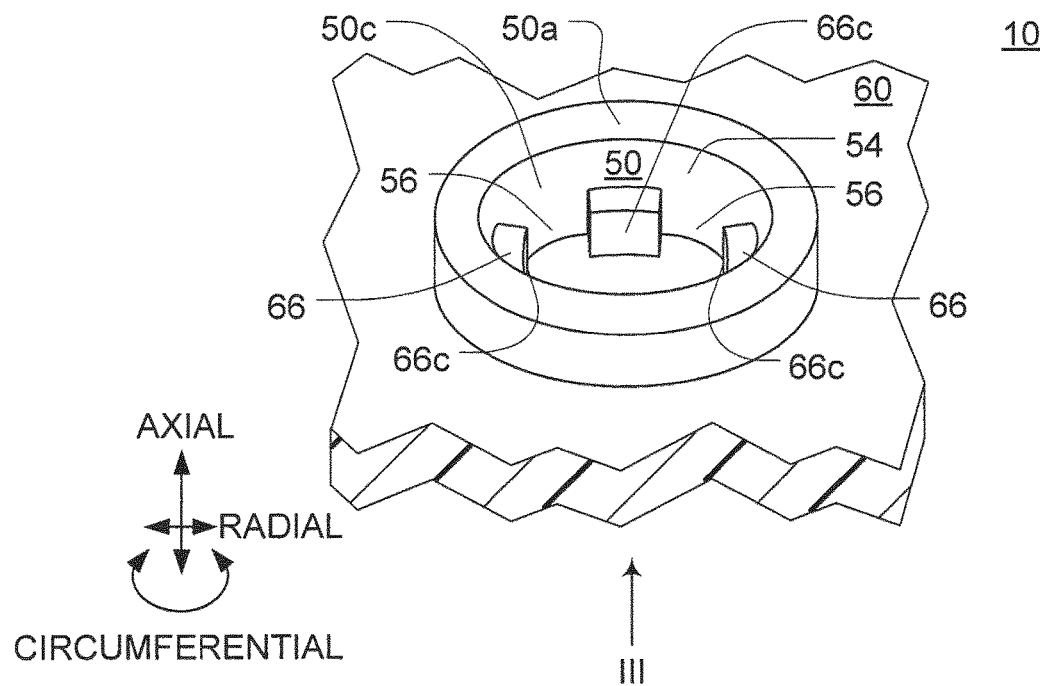
FIG. 2 is a perspective top view showing the subassembly module when viewed along an arrow II in FIG. 3.

FIGS. 2 and 3 show the compression limiter 50 and the retainer 60. It is noted that FIGS. 2 and 3 show the compression limiter 50 viewed from the bottom side of the compression limiter 50 shown in FIG. 1. In the present embodiment, the compression limiter 50 is insert-molded with the retainer 60. Specifically, the retainer 60 is over-molded on and integrated with the limiter legs 56 of the compression limiter 50. Alternatively, the compression limiter 50 may be fit into the attachment hole 60a. The retainer 60 is formed of a resin material such as ABS resin or an elastic material such as rubber. More specifically, a portion of the bracket 110 of the subassembly module 100 serves as the retainer 60.

Figure 5:
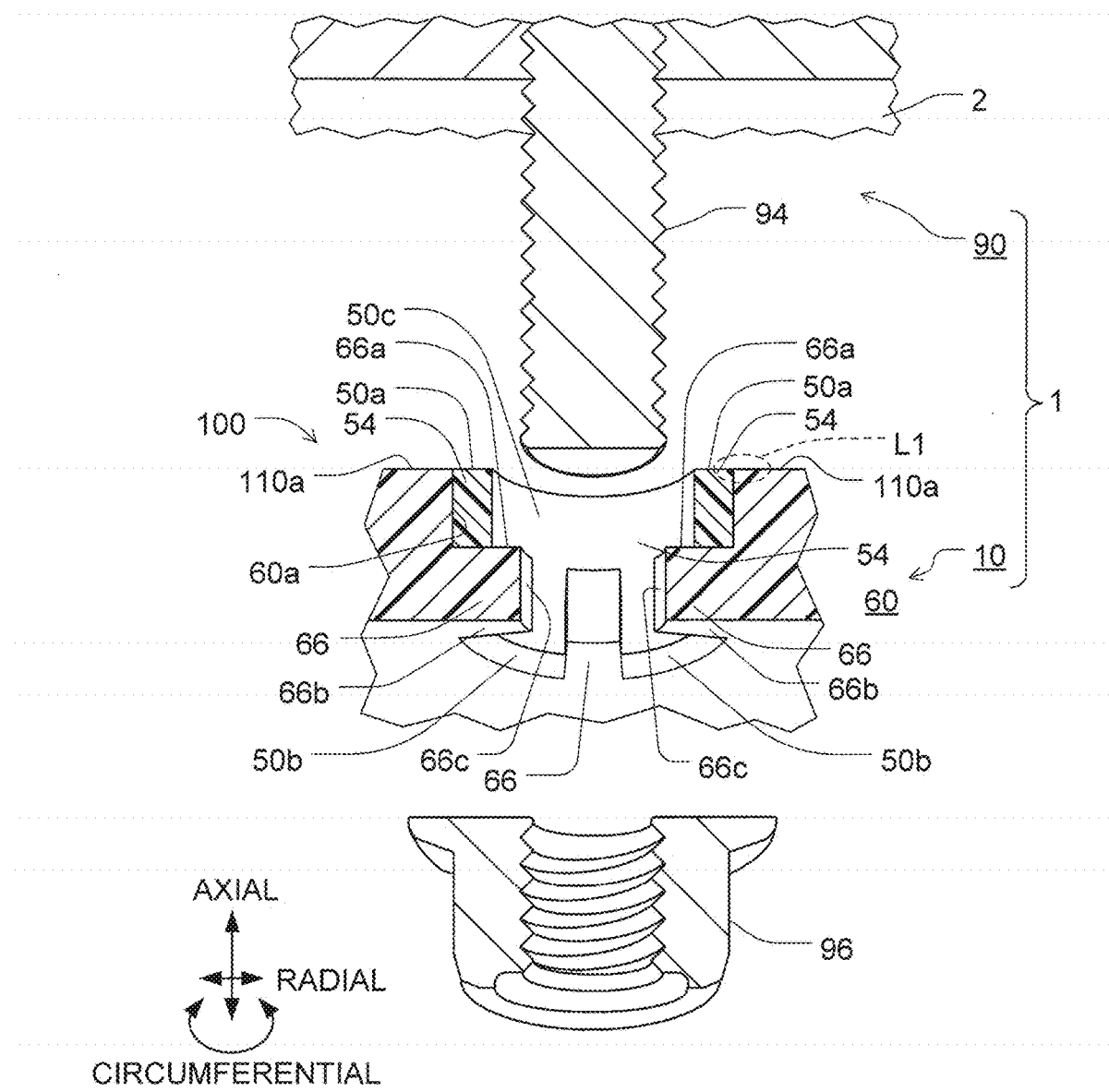
FIG. 5 is a perspective sectional bottom view showing the fastener to be coupled with the subassembly module.

In the present structure, the retainer 60 has an attachment hole 60a that is open at the bracket 110 in the axial direction as shown in FIG. 5. The retainer 60 has multiple retainer arms 66. The retainer 60 is over-molded on the limiter legs 56, such that the retainer arms 66 extend radially inward beyond the inner peripheries of the limiter legs 56. The retainer arms 66 extend radially inward into the interior of the compression limiter 50 through the notches 55, respectively. Each of the retainer arms 66 has an inner periphery 66c, which is in a round shape and extends linearly in the axial direction. The retainer arm 66 has a first end surface 66a and a second end surface 66b which are opposite to each other in the axial direction. The first end surface 66a is spaced away from the underbody 2.

The through hole 50c of the compression limiter 50 is coaxial with the attachment hole 60a.

As shown in FIG. 4, the inner peripheries 66c of the retainer arms 66 define an inscribed circle C1. The inner peripheries 66c of the retainer arms 66 extend along the inscribed circle C1 in the circumferential direction.

The retainer arm 66 is in a sector shape when viewed along the axial direction. The retainer arm 66 has a width in the circumferential direction. The width of the retainer arm 66 gradually decreases toward a tip end thereof to be in a tapered form. That is, the retainer arm 66 is wide at the root end on the radially outside and is thin at the tip end on the radially inside. The retainer arms 66 are distant from each other in the circumferential direction. The limiter legs 56 are also distant from each other in the circumferential direction. The limiter legs 56 and the retainer arms 66 are alternately located in the circumferential direction.

The retainer arms 66 and the limiter legs 56 are located at constant angular interval. In the present embodiment, four retainer arms 66 and four limiter legs 56 are provided.

In the present example, the fastener 90 includes the stud bolt (bolt) 94 and the nut 96. It should be noted that, in FIGS. 5 and 6, the lower side and the upper side in the axial direction correspond to the lower side and the upper side, respectively, in gravity.

As shown in FIG. 5, the stud bolt 94 is screwed to the underbody 2 of the vehicle in advance. Subsequently, the subassembly module 100 is placed on the lower side of the stud bolt 94, such that the through hole 50c of the compression limiter 50 is aligned with the stud bolt 94 in the radial direction. Subsequently, the subassembly module 100 is lifted upward to the stud bolt 94 and the underbody 2 from the lower side. In this way, the subassembly module 100 is pushed toward the underbody 2 such that the stud bolt 94 is inserted into the through hole 50c of the compression limiter 50 and into a clearance formed at the center of the retainer arms 66.

Referring back to FIG. 4, a solid circle 94a represents an outer periphery of a thread portion of the stud bolt 94. In the present example, the inscribed circle C1, which is defined by the inner peripheries 66c of the retainer arms 66, has an inner diameter, which is slightly smaller than the outer diameter of the thread portion of the stud bolt 94. That is, the distance between the inner peripheries 66c of the retainer arms 66 that are opposite to each other in the radial direction is slightly less than the outer diameter of the stud bolt 94. A ratio between the inner diameter of the inscribed circle C1, which corresponds to the distance between the inner peripheries 66c, and the outer diameter of the stud bolt 94 is determined, for example, in the following manner. Specifically, the inner peripheries 66c of the retainer arms 66 permit insertion of the thread therebetween, while the outer periphery of the stud bolt 94 is in frictional contact with the inner peripheries 66c. Therefore, when the stud bolt 94 is thrusted into the retainer 60, the outer periphery of the stud bolt 94 may be tightly in contact with the inner peripheries 66c of the retainer arms 66. In this state, the inner peripheries 66c of the retainer arms 66 could be slightly abraded on the threads of the stud bolt 94. In other words, the retainer arms 66 are configured to be engageable with the stud bolt 94 when the stud bolt 94 is inserted into the through hole 50c of the compression limiter 50. In this way, the subassembly module 100 can be temporarily suspended on the stud bolt 94 against the gravitational force by mounting the subassembly module 100 onto the underbody 2.

Subsequently, the nut 96 is screwed onto the tip end of the stud bolt 94 and tightened onto the subassembly module 100, whereby the subassembly module 100 is fixedly mounted to the underbody 2. Thus, the compression limiter 50, the retainer 60, and the fastener 90 form the retaining structure 1 for fixing the subassembly module 100 to the underbody 2.

Figure 6:
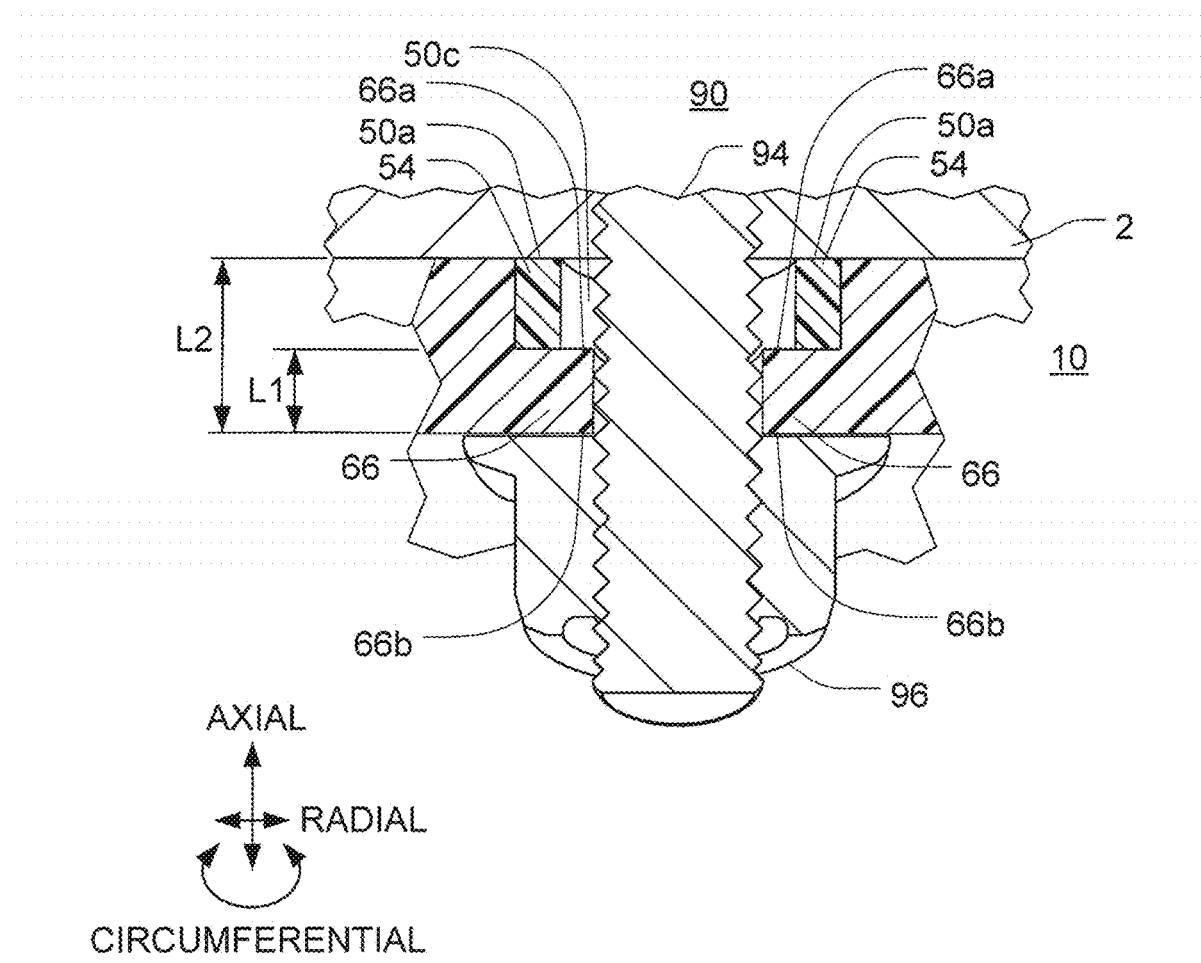
FIG. 6 is a perspective sectional bottom view showing the fastener coupled with the subassembly module.

As shown in FIG. 6, the retainer arm 66 has an arm height L1 in the axial direction. The compression limiter 50 has a limiter height L2, which is defined as a distance between the first end surface 50a and the second end surface 50b in the axial direction. The limiter height L2 is greater than the arm height L1. Furthermore, the thickness of the retainer 60 along the axial direction is defined as a retainer height. In the present embodiment, the limiter height L2 is substantially equal to the retainer height. Therefore, when the nut 96 is screwed onto the subassembly module 100, the nut 96 is brought into contact with the second end surface 50b of the compression limiter 50. Furthermore, the first end surface 50a of the compression limiter 50 is brought into contact with the underbody 2 (see FIG. 6). Therefore, the compression limiter 50 receives a screwing force from the nut 96 at the second end surfaces 50b and receives an axial compression load from the underbody 2 at the first end surface 50a in the axial direction. In this way, the compression limiter 50 protects the retainer 60 from directly receiving the screwing force and the axial compression load, thereby prohibiting the bracket 110 (the retainer 10) from creeping.

When the subassembly module 100 is installed to the underbody 2, a technician in a factory lifts the subassembly module 100 upward and aligns the subcomponents 10 with the stud bolts 94, respectively. Subsequently, the technician pushes the subassembly module 100 onto the stud bolts 94 toward the underbody 2.

As described above, when the subassembly 100 are mounted to the stud bolts 94, the thread portions of the stud bolts 94 are tightly inserted through the center clearance formed among the inner peripheries 66c of the retainer arms 66. In the present state, the retainers 60 of the bracket 110 are held by the thread portions of the stud bolts 94, respectively. Thus, the subassembly module 100 can be temporarily suspended by the stud bolts 94 and retained on the underbody 2. In this way, the technician may be enabled to use one hand or two hands to hold another component such as the nuts 96 and/or a wrench. The technician installs the nuts 96 on the ends of the stud bolts 94 and turns the nuts 96 on the stud bolts 94 to tighten the nuts 96 onto the subassembly module 100 via the subcomponents 10. In this way, the subassembly module 100 is installed on the underbody 2 of the vehicle.

The retainers 60 may be configured to absorb positional variation relative to the stud bolts 94. The details will be described with reference to FIGS. 4, 8, and 9. Referring back to FIG. 4, each of the retainers 60 originally has four retention points on the inner peripheries 66c of the four retainer arms 66, respectively. In a condition where the retainer 60 interferes with the thread portion of the stud bolt 94 at the four contact points, the thread portion of the stud bolt 94 may be steadily located and retained at a predetermined center position of the retainer 60. In the present condition, the retainer 60 and the stud bolt 94 may be coaxial with each other.

Figure 8:
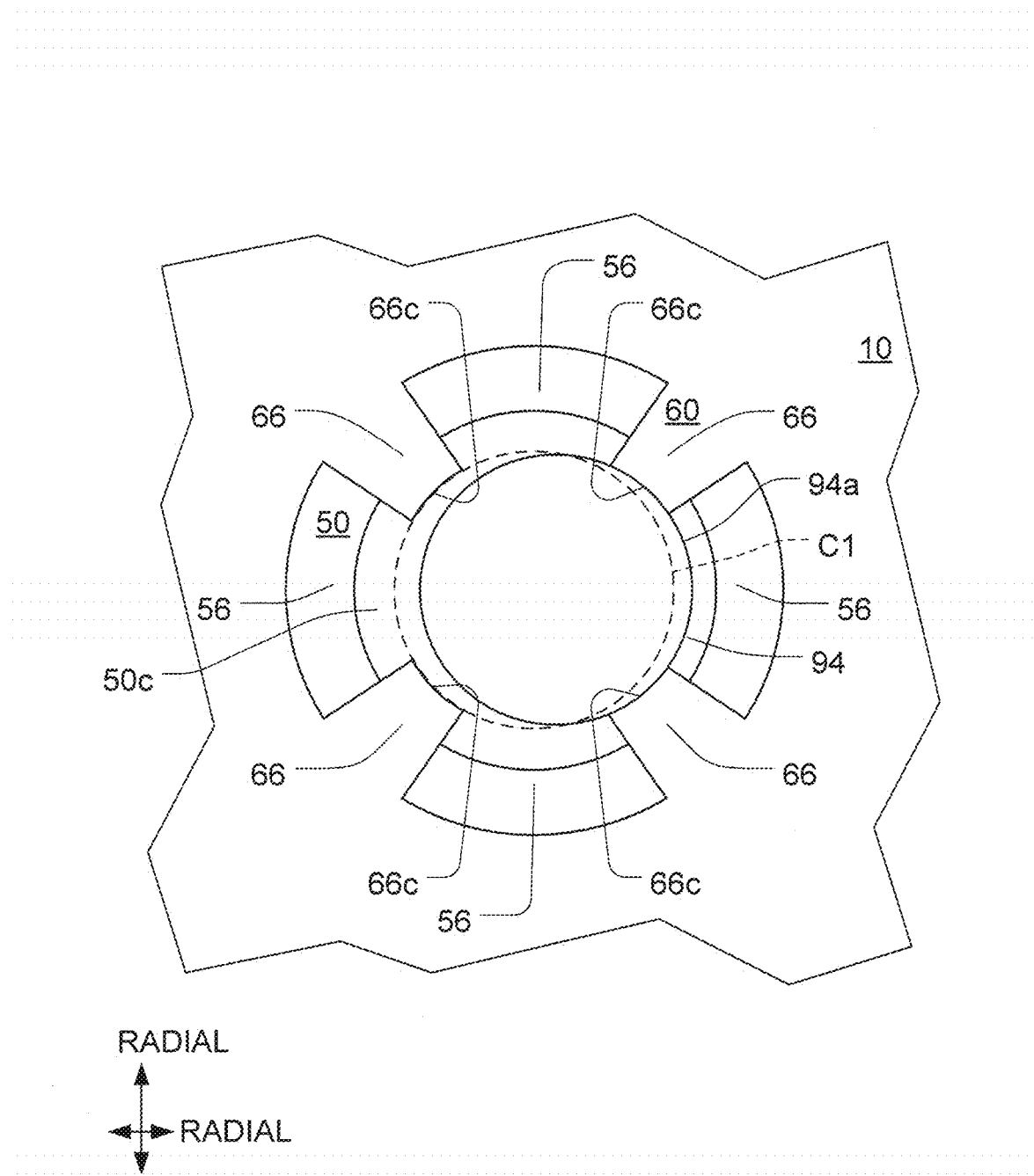
FIGS. 8 to 10 are schematic bottom views each showing an example of alignment between the subassembly module and the fastener.
Figure 9:
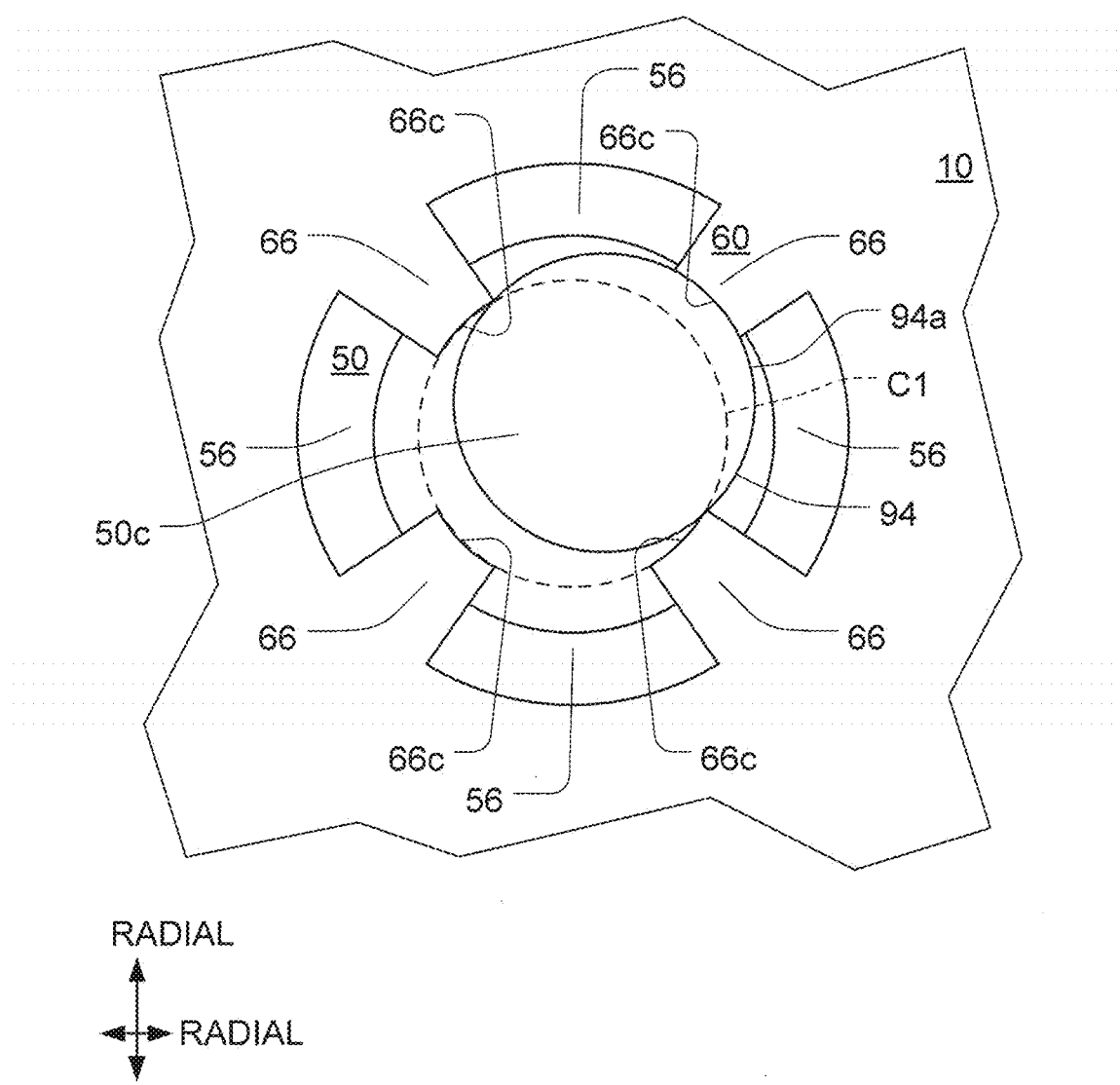

To the contrary, as shown in FIGS. 8 and 9, in a condition where misalignment arises between the retainer 60 and the stud bolt 94, the stud bolt 94 may be eccentric relative to the retainer 60. In this case, the center of the stud bolt 94 may be away from the center of the inscribed circle C1 defined by the retainer arm 66. Consequently, one or more contact point(s) may be lost.

Simultaneously, one or more of the retainer arms 66 is deformed to allow displacement of the thread portion of the stud bolt 94. In this way, the retainer 60 may absorb the positional variation thereby to produce a positional allowance. Consequently, the bracket 110 can be properly held by the fastener 90 even when the positional variation arises between the fastener 90 and the retainers 60.

Figure 10:
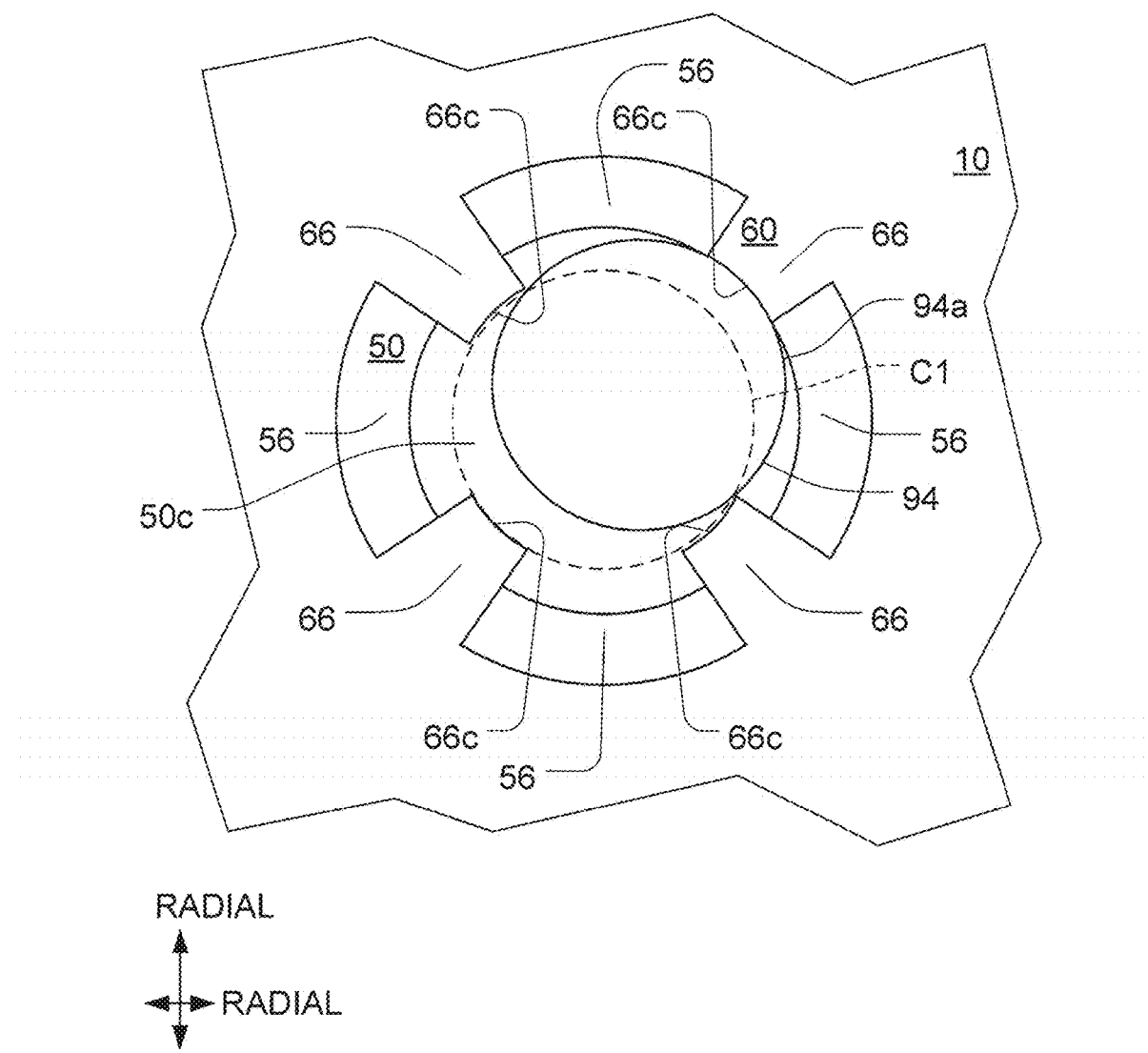

As follows, examples of proper alignment and misalignment between the retainer 60 and the stud bolt 94 will be described with reference to FIGS. 4, 8, and 9. In the example of FIG. 4, the stud bolt 94 is aligned at the center of the retainer 60 and is supported at four contact points with the four retainer arms 66. In the example of FIG. 8, the stud bolt 94 is displaced from the center of the retainer 60 radially outward by, for example, 1.5 mm and is supported at two contact points with two retainer arms 66. In the example of FIG. 9, the stud bolt 94 is displaced from the center of the retainer 60 radially outward by, for example, 2.0 mm and is supported at three contact points with three retainer arms 66. In the example of FIG. 10, the stud bolt 94 is displaced from the center of the retainer 60 radially outward by, for example, 3.0 mm and is supported at one contact point with one retainer arm 66. In a case where the stud bolt 94 is movable from the position of the example of FIG. 8 to the example of FIG. 10, the stud bolt 94 and the retainer 60 may have a tolerance of, for example, 4.5 mm.

As described above, the multiple retainer arms 66 may be configured to deform interactively to produce some flexibility (allowance) to enable to absorb the positional variation and to urge the stud bolt 94 in the radial direction in response to the positional variation. Therefore, even in the positions of the examples of FIGS. 8, 9, 10, the retainer 60 is enabled to support the stud bolt 94 with at least one arm 66. Thus, even when a positional variation arises, the retainers 60 can be engaged with the stud bolt 94.

According to the above-described example, the positional allowance would help to ensure the retainers 60 to engage with the stud bolt 94. Thus, the subassembly module 100 can be temporarily suspended thereby allowing the technician to grab and install tools, such as the nuts 96, to secure the subassembly module 100.

As described above, the compression limiter 50 protects the bracket 110 from receiving an excessive compressive force generated by screwing the fastener 90. In addition, the compression limiter 50 may regulate an axial compression load, which may potentially cause creep deformation in the bracket 110. Thus, the compression limiter 50 may protect the bracket 110 from causing creep deformation.

The retainer 60 is over-molded on the compression limiter 50 integrally with the bracket 110. Therefore, the retainer 60 need not be additionally equipped to the bracket 110. In addition, the retainer 60 need not be additionally over-molded to the bracket 110 exclusively for the purpose of retaining the stud bolt 94.

Referring back to FIG. 5, in the present example as shown by a dotted oval L1, the first end surface 50a of the compression limiter 50 is at the same level as the level of an end surface 110a of the bracket 110 in the axial direction. Specifically, the limiter body 54 has the first end surface 50a at a first level in the axial direction. The bracket 110 has an end surface 110a at a second level in the axial direction. In the present example, the first level is the same as the second level.

Figure 11:
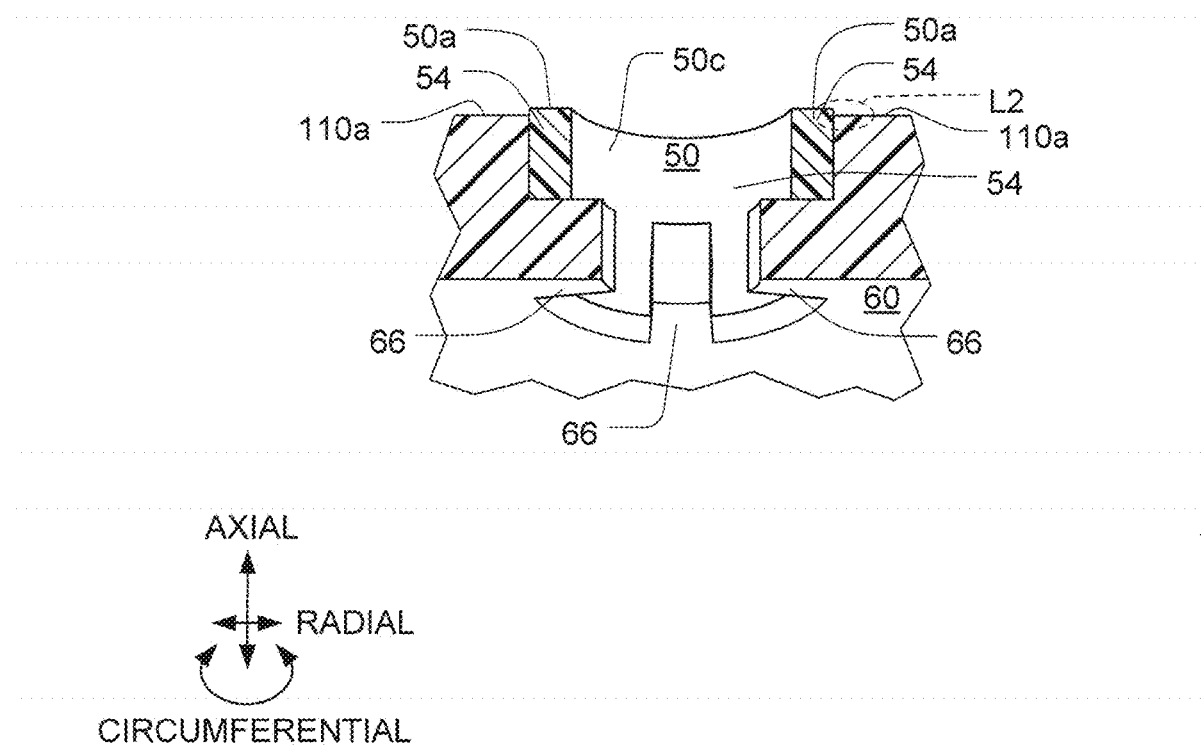
FIG. 11 is a perspective sectional bottom view showing an example of a level of an upper end surface of the compression limiter and a level of an end surface of a bracket of the subassembly module.

As shown in FIG. 11, in a modification to the first embodiment as shown by a dotted oval L2, the first end surface 50a of the compression limiter 50 is higher than the level of the end surface 110a of the bracket 110 in the axial direction. The present configuration may enable the compression limiter 50 to proactively protect the retainer 60 from directly receiving the screwing force.

Second Embodiment

Figure 12:
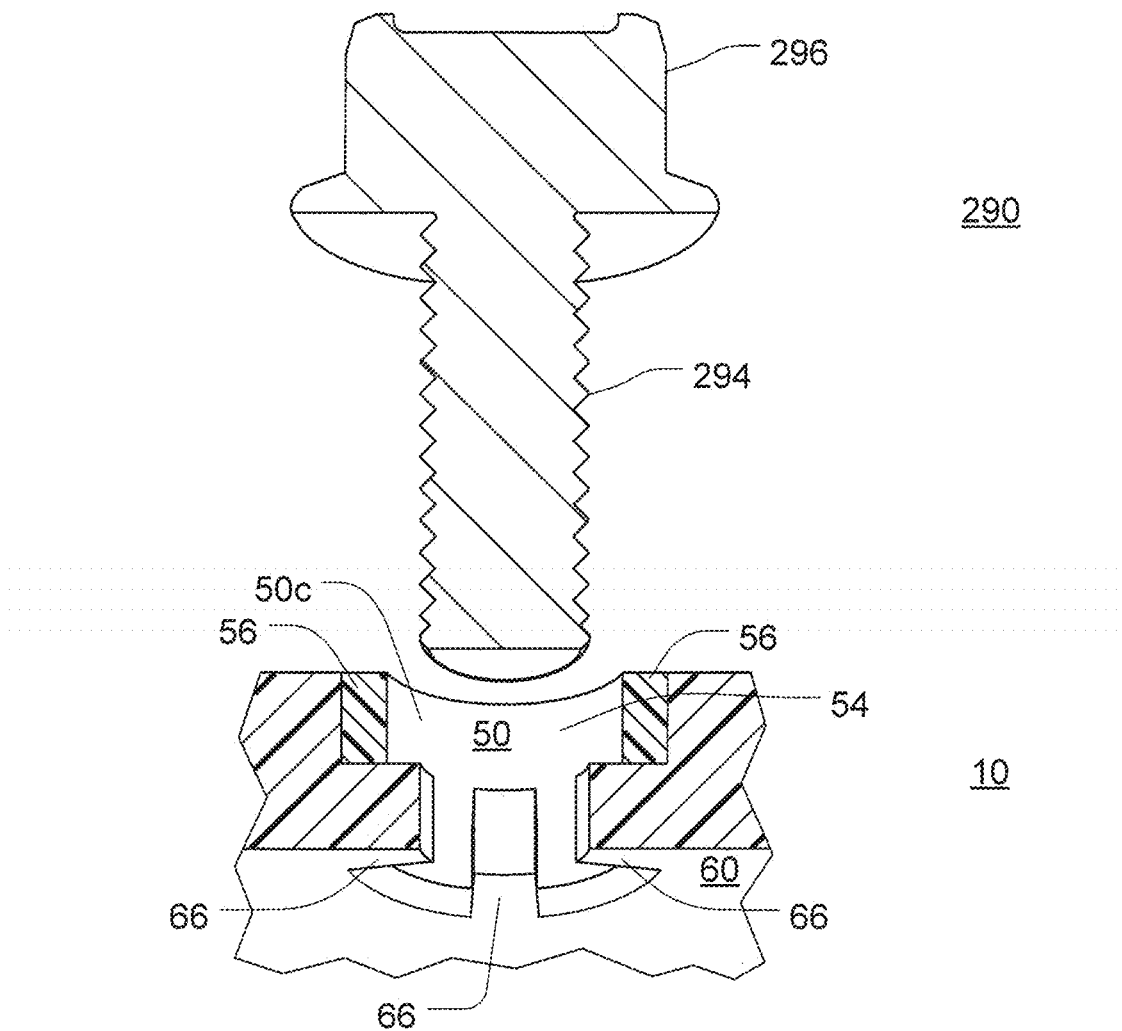
FIG. 12 is a perspective bottom view showing a fastener according to a second embodiment to be coupled with the subassembly module.

As shown in FIG. 12, the second embodiment employs a fastener 290 being a bolt having a thread portion 294 and a screw head 296. In the present example, the fastener 290 is inserted into the subassembly module 100 from the upper side in the axial direction. The fastener 290 is screwed through the subassembly module 100 to another component such as a body of a vehicle.

According to the present embodiment, the fastener 290 may be attached to the subassembly module 100, such that the screw head 296 is held by the compression limiter 50, and the fastener 290 is also retained by the retainer 60 against the gravitational force. In the present state, the fastener 290 may be retained by the subassembly module 100, even when both the fastener 290 and the subassembly module 100 are flipped upside down. For example, a manufacturer may supply the bracket 110 (see FIG. 7), which is already equipped with the fasteners 290 at the subcomponents 10, respectively. In this case, a technician need not equip a fastener 290 on the bracket 110 in a factory.

Third Embodiment

Figure 13:
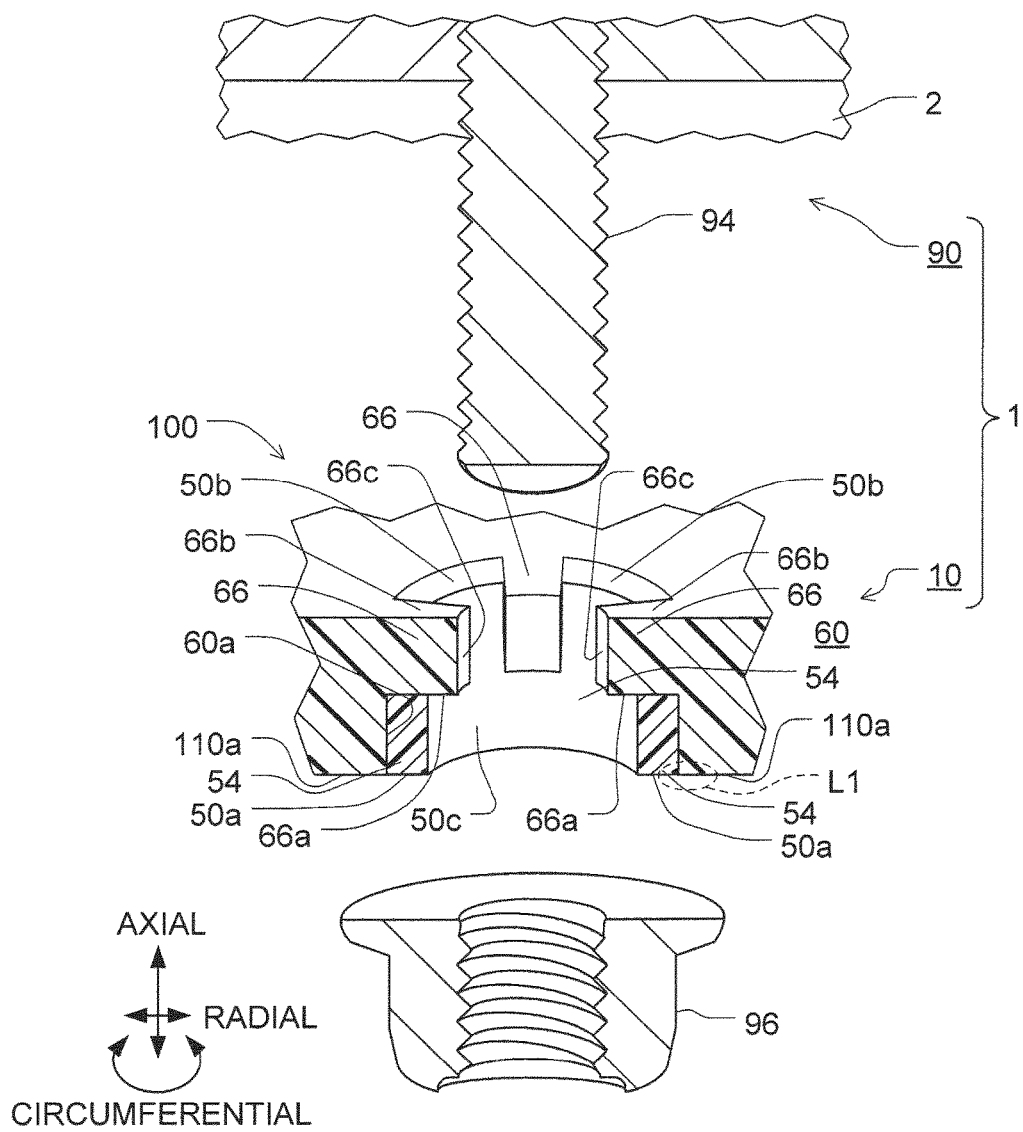
FIG. 13 is a perspective sectional view showing the retaining structure according to a third embodiment.

In the above-described embodiments, the stud bolt 94 is inserted into the through hole 50c from the first end surface 50a toward the second end surface 50b and the nut 96 is fastened to the stud bolt 94 on the second end surface 50b (see FIG. 5). In the third embodiment, the subassembly module 100 has an upside-down structure of the subassembly module 100 described in the first embodiment, as shown in FIG. 13. More specifically, the first end surface 50a forms a lower surface of the compression limiter 50 and the second end surface 50b forms an upper surface of the compression limiter 50 when the subassembly module 100 is mounted to the underbody 2. The retainer arms 66 are positioned above the limiter body 54. As with the first embodiment, the compression limiter 50 is insert-molded with the retainer 60 (i.e., the bracket 110).

When the subassembly module 100 is temporarily retained under the body 2, the subassembly module 100 is lifted such that the stud bolt 94 is inserted into the through hole 50c from the second end surface 50b toward the first end surface 50a. At this point, since the compression limiter 50 is insert-molded with the retainer 60, the compression limiter 50 is prohibited from falling from the through hole 50c due to gravity. Then, the nut 96 is fastened to the stud bolt 94 on the first end surface 50a, thereby fixing the subassembly module 100 to the underbody 2. In the present embodiment, the same effects as the first embodiment can be attained.

Other Embodiment

The subassembly module 100 may be a singular component other than the bracket 110. The device may be used to position the fastener at the center, while regulating the screwing force, separately from the bracket 110.

The inner diameter of the inscribed circle C1 formed by the retainer arms 66 may be greater than the outer diameter of the stud bolt 94. In this case, the stud bolt 94 may be loosely inserted into the clearance formed between the retainer arms 66.

The subassembly module 100 may be used upside down. That is, the limiter legs 56 may be located upward, and the limiter body 54 may be located downward. In this case, the limiter body 54 may be protruded downward from the retainer 60 in FIGS. 2 and 3, and the limiter body 54 may serve as a seat of the nut 96.

The number of the retainer arms 66 may be arbitrarily determined. The number may be two, three, five or more.

The retainer arm 66 may reduce in height radially inward. The tip end may be easily deformed to enhance allowance of the positional variation of the fastener 90.

The side opening of the compression limiter 50 is not limited to the notch 55 in a form of a slit. The side opening may be a through hole formed in the sidewall of the compression limiter 50 and may employ various shapes.

At least one of the first end surface 50a and the second end surface 50b of the compression limiter 50 may be in contact with the fastener 90 when the fastener 90 is inserted into the through hole of the compression limiter 50.

The notch 55 being a slit may be recessed from the second end surface 50b toward the first end surface 50a.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A sub-retaining structure for temporarily attaching a sub-component to a main-component, the sub-retaining structure comprising:
   a retainer provided in the sub-component and having an attachment hole; and
   a compression limiter disposed in the attachment hole of the retainer, wherein
   the compression limiter has a cylindrical shape with a through hole coaxial with the attachment hole and defines a plurality of side openings arranged in a circumferential direction, and
   the retainer includes a plurality of retainer arms each of which extends radially inward of the compression limiter through one of the plurality of side openings, wherein
   the plurality of retainer arms are configured to be engageable with a fastener protruding from the main-component when the fastener is inserted into the through hole.

2. The sub-retaining structure according to claim 1, wherein
   the compression limiter includes a first end surface and a second end surface, the first and second end surfaces being opposite to each other in an axial direction, and
   at least one of the first end surface and the second end surface is in contact with the fastener when the fastener is inserted into the through hole.

3. The sub-retaining structure according to claim 1, wherein
   the compression limiter includes a first end surface and a second end surface, the first and second end surfaces being opposite to each other in an axial direction, and
   a distance between the first end surface and the second end surface is defined as a limiter height,
   a thickness of the retainer in an axial direction is defined as a retainer height, wherein
   the limiter height is equal to or greater than the retainer height.

4. The sub-retaining structure according to claim 1, wherein
at least one of the plurality of retainer arms engages with the fastener when the fastener is inserted into the through hole.

5. The sub-retaining structure according to claim 1, wherein
each of the plurality of retainer arms has a tapered shape extending toward the center of the through hole when viewed along an axial direction.

6. The sub-retaining structure according to claim 1, wherein
the retainer is formed of resin, and
the compression limiter is formed of metal.

7. The sub-retaining structure according to claim 1, wherein
the compression limiter includes a first end surface and a second end surface, the first and second end surfaces being opposite to each other in an axial direction, and
each of the plurality of side openings is a slit recessed from one of the first end surface and the second end surface toward an other of the first end surface and the second end surface.

8. A retaining structure for fixing a sub-component to a main-component, the retaining structure comprising:
a retainer provided in the sub-component and having an attachment hole;
a compression limiter disposed in the attachment hole of the retainer; and
a fastener fixed to the main-component and protruding from the main-component, wherein
the compression limiter has a cylindrical shape with a through hole coaxial with the attachment hole and defines a plurality of side openings arranged in a circumferential direction, and
the retainer includes a plurality of retainer arms each of which extends radially inward of the compression limiter through one of the plurality of side openings, wherein
the plurality of retainer arms are configured to be engageable with the fastener when the fastener is inserted into the through hole.

9. The retaining structure according to claim 8, wherein
the compression limiter includes a first end surface and a second end surface, the first and second end surfaces being opposite to each other in an axial direction, and
at least one of the first end surface and the second end surface is in contact with the fastener when the fastener is inserted into the through hole.

10. The retaining structure according to claim 8, wherein
the compression limiter includes a first end surface and a second end surface, the first and second end surfaces being opposite to each other in an axial direction, and
a distance between the first end surface and the second end surface is defined as a limiter height,
a thickness of the retainer in an axial direction is defined as a retainer height, wherein
the limiter height is equal to or greater than the retainer height.

11. The retaining structure according to claim 8, wherein
at least one of the plurality of retainer arms engages with the fastener when the fastener is inserted into the through hole.

12. The retaining structure according to claim 8, wherein
each of the plurality of retainer arms has a tapered shape extending toward the center of the through hole when viewed along an axial direction.

13. The retaining structure according to claim 8, wherein
the retainer is formed of resin, and
the compression limiter is formed of metal.

14. The retaining structure according to claim 8, wherein
the compression limiter includes a first end surface and a second end surface, the first and second end surfaces being opposite to each other in an axial direction, and
each of the plurality of side openings is a slit recessed from one of the first end surface and the second end surface toward an other of the first end surface and the second end surface.

15. The retaining structure according to claim 8, wherein
the compression limiter includes a first end surface and a second end surface, the first and second end surfaces being opposite to each other in an axial direction,
the fastener includes a bolt and a nut, and
the bolt is inserted into the through hole from the first end surface toward the second end surface and the nut is fastened to the bolt on the second end surface.

16. The retaining structure according to claim 8, wherein
the compression limiter includes a first end surface and a second end surface, the first and second end surfaces being opposite to each other in an axial direction,
the fastener includes a bolt and a nut, and
the bolt is inserted into the through hole from the second end surface toward the first end surface and the nut is fastened to the bolt on the first end surface.

17. The retaining structure according to claim 16, wherein
the compression limiter is insert-molded with the retainer not to fall from the attachment hole.

18. The retaining structure according to claim 16, wherein
the compression limiter is fit into the attachment hole not to fall from the attachment hole.

* * * * *